United States Patent
Lin

(10) Patent No.: US 7,764,522 B2
(45) Date of Patent: Jul. 27, 2010

(54) CIRCUIT AND METHOD FOR CONTROLLING THE START-UP CYCLE OF A POWER SUPPLY

(75) Inventor: Kuo-Fan Lin, Taoyuan Hsien (TW)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 483 days.

(21) Appl. No.: 11/812,208

(22) Filed: Jun. 15, 2007

(65) Prior Publication Data

US 2008/0310196 A1      Dec. 18, 2008

(51) Int. Cl.
*H02M 7/5375*    (2006.01)

(52) U.S. Cl. .................. 363/49; 363/56.01; 363/97; 323/901

(58) Field of Classification Search .................. 323/901; 363/49, 55, 56.01, 97

See application file for complete search history.

(56) References Cited

U.S. PATENT DOCUMENTS 4,941,076 A * 7/1990 Diaz ........................... 363/49

FOREIGN PATENT DOCUMENTS

TW              501830         9/2002

* cited by examiner

*Primary Examiner*—Jeffrey L Sterrett
(74) *Attorney, Agent, or Firm*—Muncy, Geissler, Olds & Lowe, PLLC

(57) ABSTRACT

The present invention discloses a method and a circuit for controlling a start-up cycle of an integrated circuit in a circuit system. The method and circuit determine whether or not an input power of the circuit system and a bias voltage power of the integrated circuit have reached a normal operating voltage range to control the bias voltage power to produce a start-up cycle of the integrated circuit. The method and circuit also provides a protection mechanism for an overload of the circuit system overload, so that the integrated circuit can moderate surges and prevent damages.

19 Claims, 7 Drawing Sheets

CIRCUIT AND METHOD FOR CONTROLLING THE START-UP CYCLE OF A POWER SUPPLY

FIELD OF THE INVENTION

The present invention relates to a method for controlling a start-up cycle and a circuit of using the same, and more particularly to a method for controlling a start-up cycle and a circuit of using the method by determining whether or not the operating voltage is normal.

BACKGROUND OF THE INVENTION

In general, a power supply includes a power factor correction (PFC) unit and a pulse wave control unit, or further includes a stationary power control unit, and all of the units are integrated into several different integrated circuits (ICs) or into a single integrated circuit in order to save space and power loss. Further, a detection input voltage and a self-start function can be added to the integrated circuit, so that the integrated circuit can control a bias voltage power (Vcc) by detecting and determining whether or not the inputted alternating current of the integrated circuit has reached the operating voltage, and then the integrated circuit decides whether or not to start a circuit unit in the integrated circuit. If the inputted alternating current has not reached a normal operating voltage, the integrated circuit will shut automatically and repeat detecting whether or not the alternating current falls within the range of the normal operating voltage. The aforementioned prior art has been disclosed in R.O.C. Patent Publication No. 501830 entitled "Improved switching power supply". Referring to FIGS. 2 and 3, a waveform 3 shown in FIG. 3 is the waveform of the voltage at node X as shown in FIG. 2. The traditional procedure of detecting an alternating current and starting up the integrated circuit includes the following steps:

The bias voltage power Vcc charges a capacitor C1, so that the voltage at node X rises to a start-up voltage for starting each unit of the integrated circuit. If the alternating current has not reached the normal operating voltage, then the load effect of starting the integrated circuit drops the voltage at the node X to a cut-off voltage value for shutting each unit of the integrated circuit, and then charges the capacitor C1 to the start-up voltage value again, and repeats the foregoing procedure until the alternating current reaches the normal operating voltage. Although the aforementioned operating mode of detecting the cycle of the alternating current can be predicted, yet the time for the alternating current to reach the normal operating voltage cannot be predicted, and thus the cycle for starting the integrated circuit differs from the cycle of normally inputting the alternating current normal, and the difference of cycles may cause a too-short buffer time for a system boot, and the surge may damage components. On the other hand, the voltage at node X will drop to the cut-off voltage value and then will shut the integrated circuit if an overload occurs suddenly in a normal operation. As a result, the load effect of the integrated circuit is eliminated, and the alternating current remains at the normal operating voltage, and the voltage at node X rises to the start-up voltage value again. The voltage drops again due to the overload, and the integrated circuit repeats the starting and shutting processes quickly during the period of detecting alternating current and overload. As a result, a large power loss and an overheat occur, which will directly affect the life expectancy of the integrated circuit. Obviously, the conventional control method and circuit require improvements.

SUMMARY OF THE INVENTION

In view of the aforementioned shortcomings of the prior art, the primary objective of the present invention is to provide a method for improving the start-up cycle of an integrated circuit and a circuit using the same.

The present invention relates to a method for controlling a start-up cycle and a circuit of using the same, and the method and the circuit control the start-up cycle of an integrated circuit in a circuit system, and the integrated circuit sets a start-up voltage value for starting the integrated circuit, and a cut-off voltage value for shutting the integrated circuit, and the integrated circuit obtains a bias voltage power when an AC voltage is inputted into the circuit system, and the start-up cycle rises from the idle voltage value to the start-up voltage value through the bias voltage power to start the integrated circuit or drops from the start-up voltage value to the cut-off voltage value to shut the integrated circuit. The method includes the steps of defining a normal operating voltage value and the idle voltage value and determining whether or not the input power average has reached the normal operating voltage value, and maintaining the bias voltage power at the idle voltage value or increasing the bias voltage power to the start-up voltage value for issuing an instruction of starting the integrated circuit after the determination. The method also includes the step of dropping the bias voltage power to the idle voltage and then rising to the start-up voltage value when the system is overloaded in order to avoid a sudden change of voltage that may damage the integrated circuit. The circuit using the method comprises a buffer unit, an input voltage detection unit, a bias voltage detection unit, a control unit and a bypass modulation unit, wherein the buffer unit is connected externally to the alternating current and provides a buffer time, and the buffer unit is connected to an external capacitor for obtaining an input power average. The input voltage detection unit determines whether or not the input power average has reached the normal operating voltage. If the input power average has not reached the normal operating voltage value, then the control unit commands the bypass modulation unit to restrict the bias voltage power to be maintained at the idle voltage value. The bias voltage detection unit obtains the bias voltage power, and determines whether or not the bias voltage power has reached the start-up voltage value, and the control unit determines whether or not the predetermined voltage standard has been reached to send out a start-up signal for starting the integrated circuit according to the input power average and the bias voltage power.

DETAILED DESCRIPTION OF THE PREFERRED EMBODIMENTS

The present invention will now be described in more detail hereinafter with reference to the accompanying drawings that show various embodiments of the invention.

Figure 1:
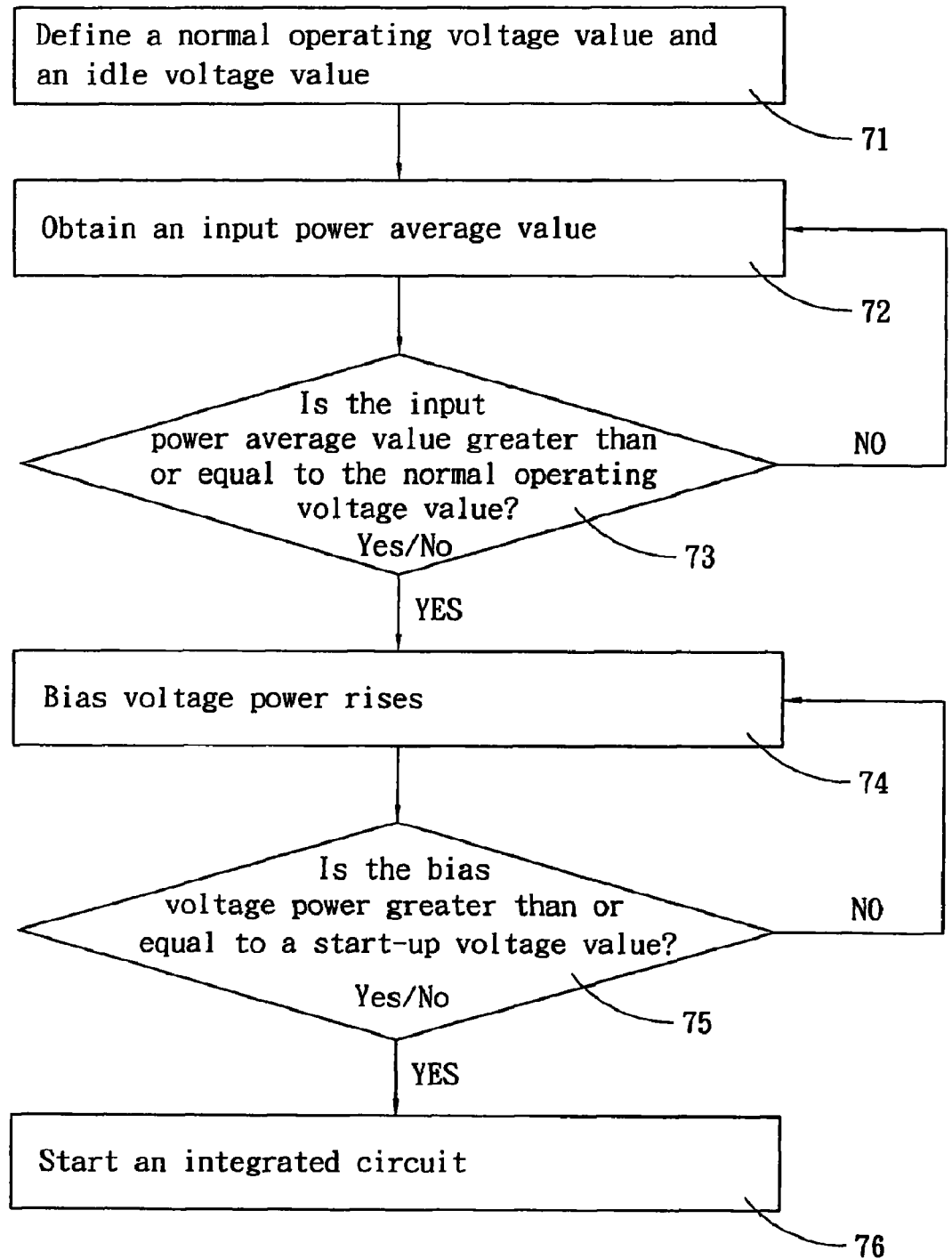
FIG. 1 is a flow chart of a start-up procedure of the present invention.
Figure 2:
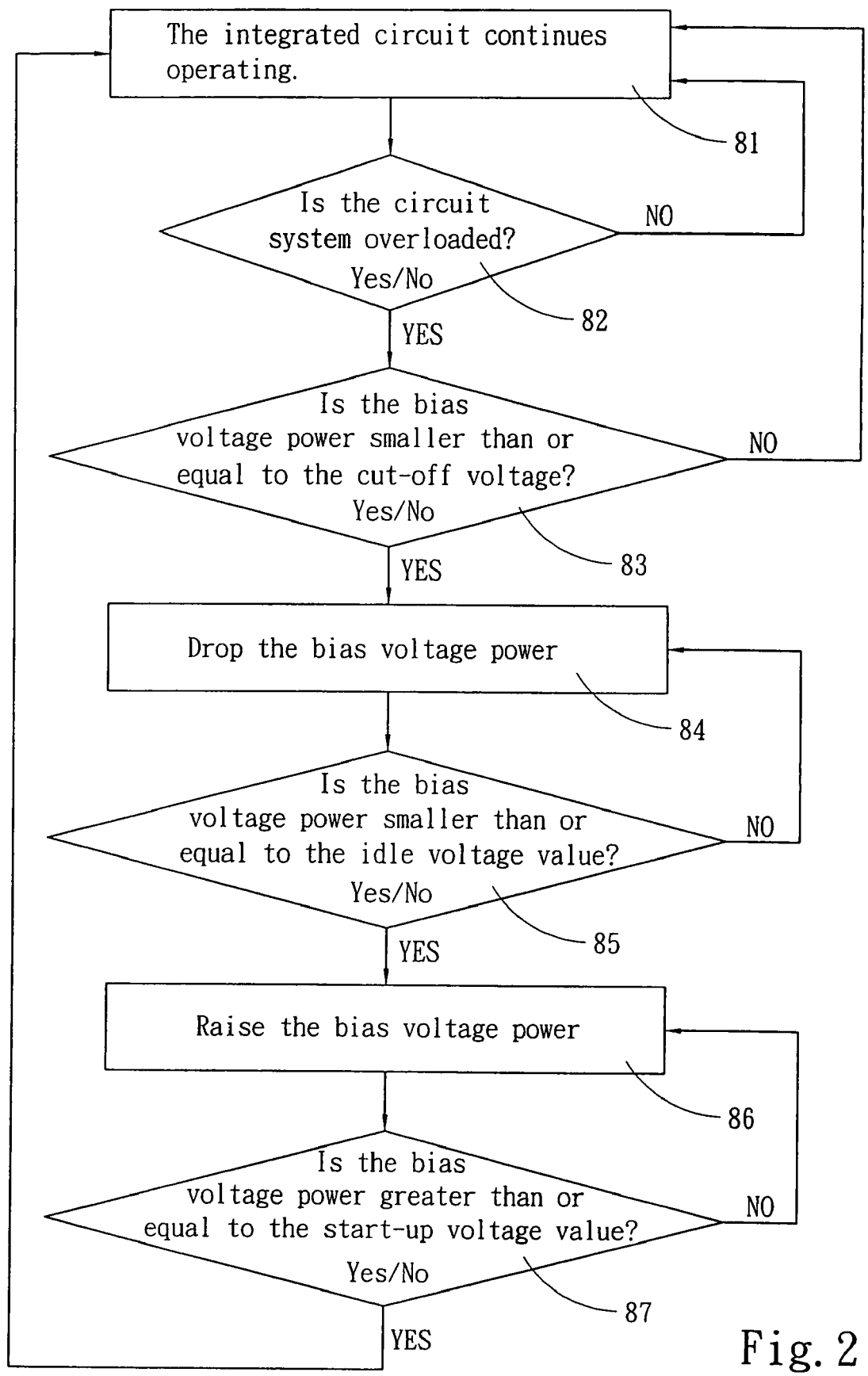
FIG. 2 is a flow chart of an overload protection procedure of the present invention.

The present invention relates to a method for controlling a start-up cycle and a circuit of using the same, and the method and the circuit control a start-up cycle of an integrated circuit in a circuit system of a power supply. The circuit system obtains an alternating current input and uses the alternating current to obtain a bias voltage power for the normal operation of the integrated circuit, and the integrated circuit sets up a start-up voltage value for starting the integrated circuit and a cut-off voltage value for shutting the integrated circuit, and the start-up cycle of the integrated circuit drives the bias voltage power to rise from the idle voltage to the start-up voltage value for starting the integrated circuit or drop from the start-up voltage value to the cut-off voltage value for shutting the integrated circuit, wherein the control method comprises the steps of: defining an normal operating voltage value and an idle voltage value of the power system; and determining whether or not the input power average has reached the normal operating voltage value, and if the input power average has not reached the normal operating voltage value, then the bias voltage power will be maintained at the idle voltage value, and if the AC voltage has reached the normal operating voltage value, then the bias voltage power will rise to the start-up voltage value to start operating the integrated circuit. If the circuit system is overloaded to drop the bias voltage power from the start-up voltage value to the cut-off voltage value, then the integrated circuit will be shut and the bias voltage power will continue dropping to the idle voltage value and then will rise from the idle voltage value to the start-up voltage value again, and thus the starting and shutting process of the integrated circuit is repeated until the overload state is released. Referring to FIG. 1 for the start-up procedure of the aforementioned control method, the method comprises the steps of: defining the normal operating voltage value and the idle voltage value 71, and then obtaining the input power average 72; determining whether or not the input power average 72 is larger than or equal to the normal operating voltage value 73; continuing obtaining the input power average 72 if the input power average 72 is not larger than or equal to the normal operating voltage value 73, or raising the bias voltage power to 74 if the normal operating voltage value is larger than or equal to the normal operating voltage value 73; and determining whether or not the bias voltage power is larger than or equal to the start-up voltage value 75, and starting the integrated circuit 76 if the bias voltage power is larger than or equal to the start-up voltage value 75. Referring to FIG. 2 for an overload protection procedure, the procedure comprises the steps of: determining whether or not the circuit system is overloaded 82 when the integrated circuit has continued working 81, and determining whether or not the bias voltage power is smaller than or equal to the cut-off voltage value 83 if there is an overload, and continuing dropping the bias voltage power to 84 if the bias voltage power is smaller than or equal to cut-off voltage value, and starting determining whether or not the bias voltage power is smaller than or equal to the idle voltage value 85, and raising the bias voltage power to 86 if the bias voltage power is smaller than or equal to the idle voltage value 85, while determining whether or not the bias voltage power is larger than or equal to the start-up voltage value 87, and restarting the integrated circuit to resume the operating state if the bias voltage power is larger than or equal to the start-up voltage value 75. With the aforementioned method, we can assure that the bias voltage power of the inputted alternating current rises after it has reached the normal operating voltage to guarantee a sufficient buffer time between the time when the alternating current reaches the normal operating voltage value and the time when the bias voltage power reaches the start-up voltage value 75. Further, the circuit system forces the bias voltage power to continue dropping to the idle voltage value 85 and then rising to the start-up voltage value 75 again when the circuit system is overloaded, such that when the overload drops the bias voltage power to the cut-off voltage value 83, the integrated circuit is forced not to repeat its starting and shutting process or cause too much loss of power, until the overload state is released to resume the normal operation of the integrated circuit.

Figure 3:
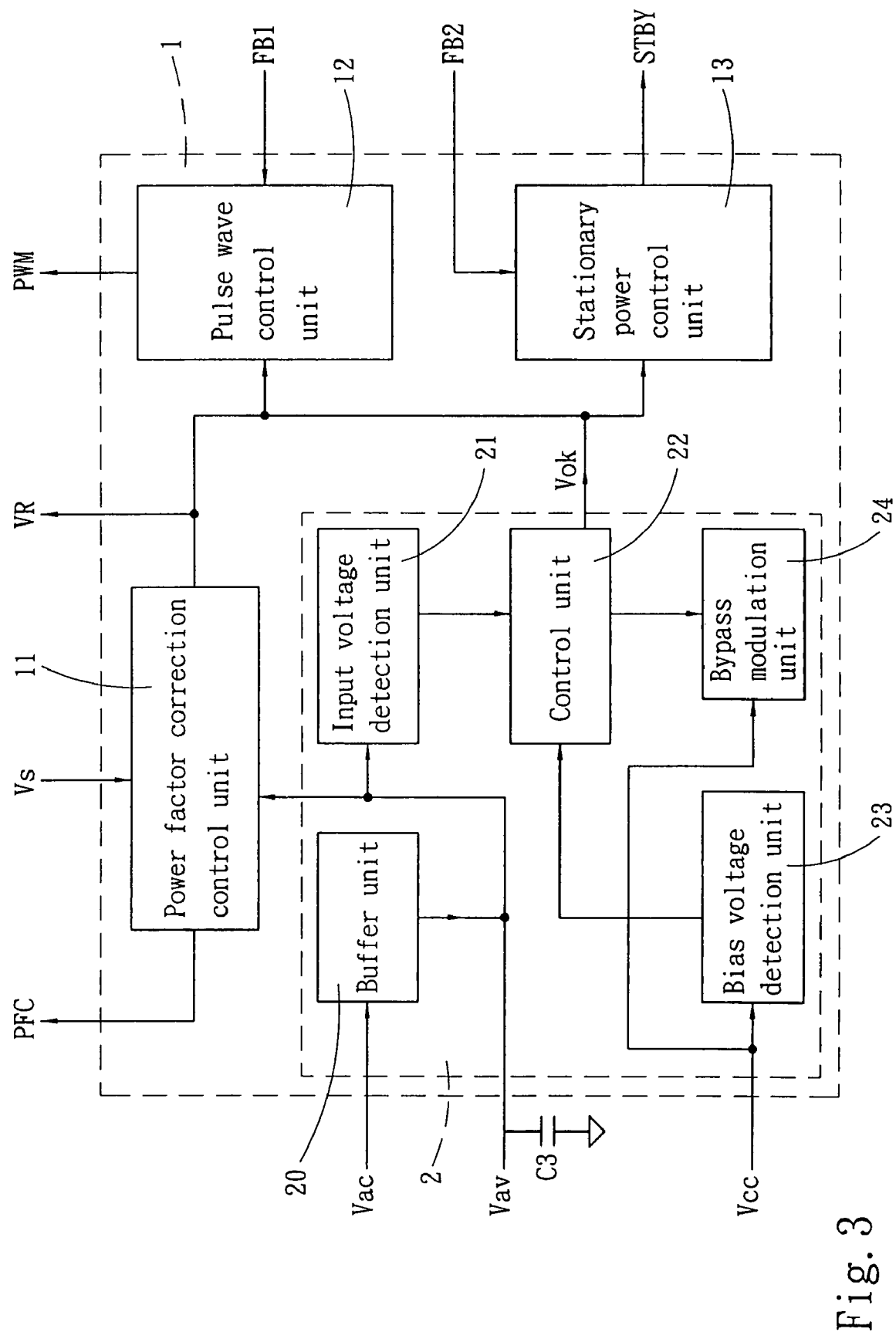
FIG. 3 is a circuit block diagram of a circuit of the present invention.

Referring to FIG. 3 for a block diagram of a control circuit capable of avoiding a too-large power loss caused by a sudden quick switch during an abnormal situation, the start-up cycle control circuit 2 comprises a buffer unit 20, an input voltage detection unit 21, a bias voltage detection unit 23, a control unit 22 and a bypass modulation unit 24, and the start-up cycle control circuit 2 is integrated into the integrated circuit 1 and includes an alternating current input terminal and a bias voltage input terminal for obtaining an alternating current Vac and a bias voltage power Vcc respectively. The buffer unit 20 is connected to the alternating current input terminal for obtaining the alternating current Vac and providing a buffer time of a power input to avoid surges or damages to the circuit. The output terminal of the buffer unit 20 is connected to an external capacitor for obtaining the input power average Vav. After the input voltage detection unit 21 obtains the input power average Vav, the input power average Vav is compared with a predetermined normal operating voltage value to determine whether or not the input power average Vav has reached the normal operating voltage value. The input power average Vav obtained by the buffer unit 20 is inputted to the power factor control unit 11 as a reference for correcting the power factor. The bias voltage input terminal obtains the bias voltage power Vcc, and the bias voltage input terminal is connected to the bias voltage detection unit 23 and the bypass modulation unit 24, and the bypass modulation unit 24 is controlled by the control unit 22. If the input power average Vav or the bias voltage power Vcc is abnormal, then the control unit 22 will drive the bypass modulation unit 24 to divide the voltage of the bias voltage power Vcc, so that the voltage inputted to the bias voltage detection unit 23 is maintained at the idle voltage value. If the input power average Vav or the bias voltage power Vcc is normal, then the control unit 22 will drive the bypass modulation unit 24 to stop the voltage division, so that the bias voltage power Vcc rises to the normal operating voltage value. Now, the control unit 22 generates a start-up signal Vok to drive the integrated circuit 1 to start operating. If the integrated circuit 1 is operated normally, then the overload of the power supply overload will cause the bias voltage detection unit 23 to detect a drop of the bias voltage power Vcc to the cut-off voltage value, and the control unit 22 will drive the bypass modulation unit 24 to start performing a voltage division, such that the bias voltage power Vcc remains at the idle voltage value and then rises to the start-up voltage value, and this process repeats starting and closing the integrated circuit until the overload state is released. Therefore, the start-up cycle control circuit 2 can determine whether or not the alternating current Vac has reached a normal operating voltage, and determine whether or not the bias voltage power Vcc has reached a sufficient voltage for normally starting the integrated circuit 1 as well as assuring a sufficient buffer time between a start of the integrated circuit 1 and a stable condition of an input power average Vav, so as to prevent surges or damages to the circuits and components. For an overload, the bias voltage power Vcc drops to the idle voltage value and then rises to the start-up voltage value to extend the time from shutting the overload to restarting the integrated circuit, so as to prevent overheat or burning by the quick repeated shutting and starting processes.

Figure 4:
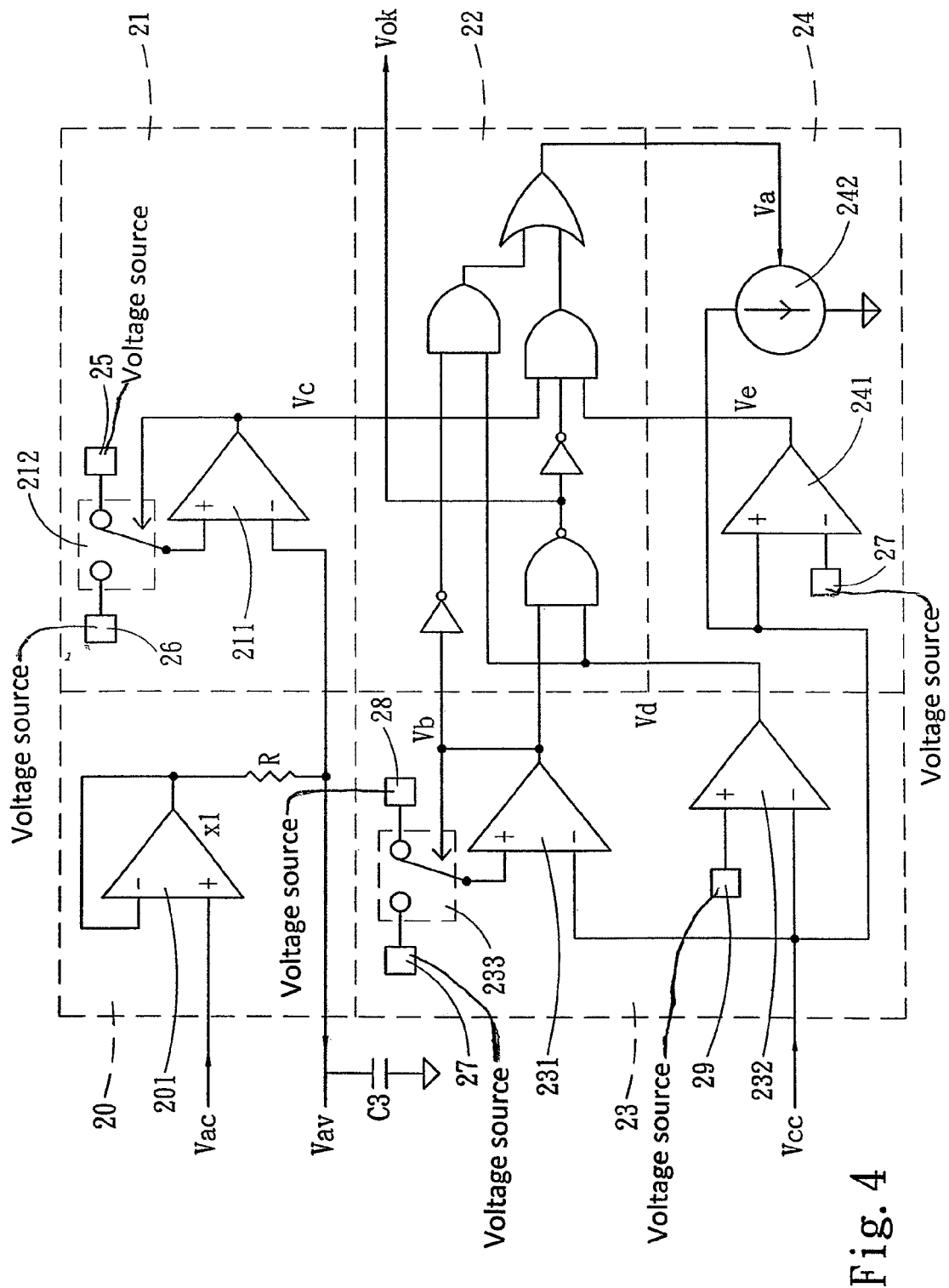
FIG. 4 is a circuit diagram of a circuit architecture of the present invention.

Referring to FIG. 4 for a start-up cycle control circuit 2 in accordance with a preferred embodiment of the present invention, the buffer unit 20 is comprised of a comparator C 201 and a resistor, wherein the comparator C 201 includes a positive terminal, a negative terminal and an output terminal, and the resistor and the negative terminal of the comparator C 201 are connected to the output terminal, and the positive terminal of the comparator C 201 is connected to the alternating current input terminal for obtaining the alternating current Vac, and the negative terminal and the output terminal are connected to form a buffer, and the buffer unit 20 is connected to an external capacitor C3 for obtaining the inputted input power average Vav. The input voltage detection unit 21 includes a comparator D 211 having a positive terminal, a negative terminal, and an output terminal, and a first constant voltage source 25, a second constant voltage source 26 and a switch A 212 are controlled by an output of the comparator D 211. The first constant voltage source 25 defines the normal operating voltage, and the second constant voltage source 26 defines an abnormal operating voltage value, and the negative terminal of the comparator D 211 obtains the input power average Vav, and the positive terminal of the comparator D 211 is connected to an end of the switch A 212, and another end of the switch A 212 is switched to the first constant voltage source 25 or the second constant voltage source 26, and the switch of the switch A 212 is controlled by an output of the comparator D 211. The comparator D 211 compares the input power average Vav with the normal operating voltage or abnormal operating voltage, such that if the input power average Vav is smaller than the normal operating voltage, the output terminal of the comparator D 211 outputs an input abnormal signal Vc and the input abnormal signal Vc maintains an end of the switch A 212 to be connected to the first constant voltage source 25, and if the input power average Vav is greater than the normal operating voltage value, then the comparator D 211 stops outputting the input abnormal signal Vc, and the switch A 212 is switched and connected to the second constant voltage source 26, and if the input power average Vav drops from the normal operating voltage to the abnormal operating voltage value, the comparator D 211 outputs the input abnormal signal Vc, and an end of the switch A 212 is switched from the second constant voltage source 26 to the first constant voltage source 25 for continuing detecting the magnitude of the input power average Vav. The bias voltage detection unit 23 includes a comparator A 231 and a comparator B 232, each having a positive terminal, a negative terminal and an output terminal, and a third voltage source 27, a fourth constant voltage source 28, a fifth constant voltage source 29 and a switch B 233, wherein the third voltage source 27 defines the idle voltage value, and the fourth constant voltage source 28 defines the start-up voltage value, and the fifth constant voltage source 29 defines the cut-off voltage value, and the negative terminal of the comparator A 231 is connected to the bias voltage input terminal, and the positive terminal of the comparator A 231 is connected to an end of the switch B 233, and another end of the switch B 233 is switched to the third voltage source 27 or the fourth constant voltage source 28, and the output terminal of the comparator A 231 is connected to the control unit 22, and the switch of the switch B 233 is controlled by an output of the comparator A 231, and the negative terminal of the comparator B 232 is connected to the bias voltage input terminal, and the positive terminal of the comparator B 232 is connected to the fifth constant voltage source 29, and the output terminal of the comparator B 232 is connected to the control unit 22. If the bias voltage power Vcc is smaller than the start-up voltage value, the comparator A 231 will output the too-low bias voltage signal Vb to connect an end of the switch B 233 to the fourth constant voltage source 28. If the bias voltage power Vcc rises to the start-up voltage value, the switch B 233 will be switched and connected to the third voltage source 27. If the bias voltage power Vcc drops below the cut-off voltage value, the comparator B 232 will output the bias voltage abnormal signal Vd. The control unit 22 is comprised of a plurality of logic gates for receiving outputs of the input voltage detection unit 21 and the bias voltage detection unit 23. If the input power average Vav and bias voltage power Vcc are too low or abnormal, a voltage division signal will be outputted to the bypass modulation unit 24. The bypass modulation unit 24 includes a comparator E 241 having a positive terminal, a negative terminal and an output terminal and a voltage division loop having a current source 242, and the positive terminal of the comparator E 241 is connected to the bias voltage power input terminal and the voltage division loop, and the negative terminal of the comparator E 241 is connected to the third voltage source 27, and the output terminal of the comparator E 241 is connected to the control unit 22, wherein the starting and shutting process of a current source 242 of the voltage division loop is controlled by a voltage division signal of the control unit 22. When the voltage division signal is received, the current source 242 performs a voltage division of the bias voltage power Vcc and maintains or drops the idle voltage value. When the bias voltage power Vcc in an overload condition drops below the cut-off voltage value, the integrated circuit 1 is shut to eliminate the load effect. To extend the timing of restarting the integrated circuit 1, the bias voltage detection unit 23 outputs the bias voltage abnormal signal Vd to the control unit 22. With a logical operation of the control unit 22, the voltage division signal drives the bypass modulation unit 24 to start performing a voltage division, such that the bias voltage power Vcc drops to the idle voltage value. After the bias voltage power Vcc drops below the idle voltage value, the comparator A 231 outputs the too-low bias voltage signal Vb, and the switch B 233 is switched and connected to the fourth constant voltage source 28, and the fourth constant voltage source 28 is compared with the bias voltage power Vcc. If the bias voltage power Vcc has not reached the defined start-up voltage value of the fourth constant voltage source 28, the logical operation of the control unit 22 drives the bypass modulation unit 24 to stop performing the voltage division, and the bias voltage power Vcc keeps rising back to the start-up voltage, and the aforementioned starting and shutting process is repeated until the overload state ends, so as to protect the circuit from being burned or damaged due to the quick starting and shutting.

Figure 5:
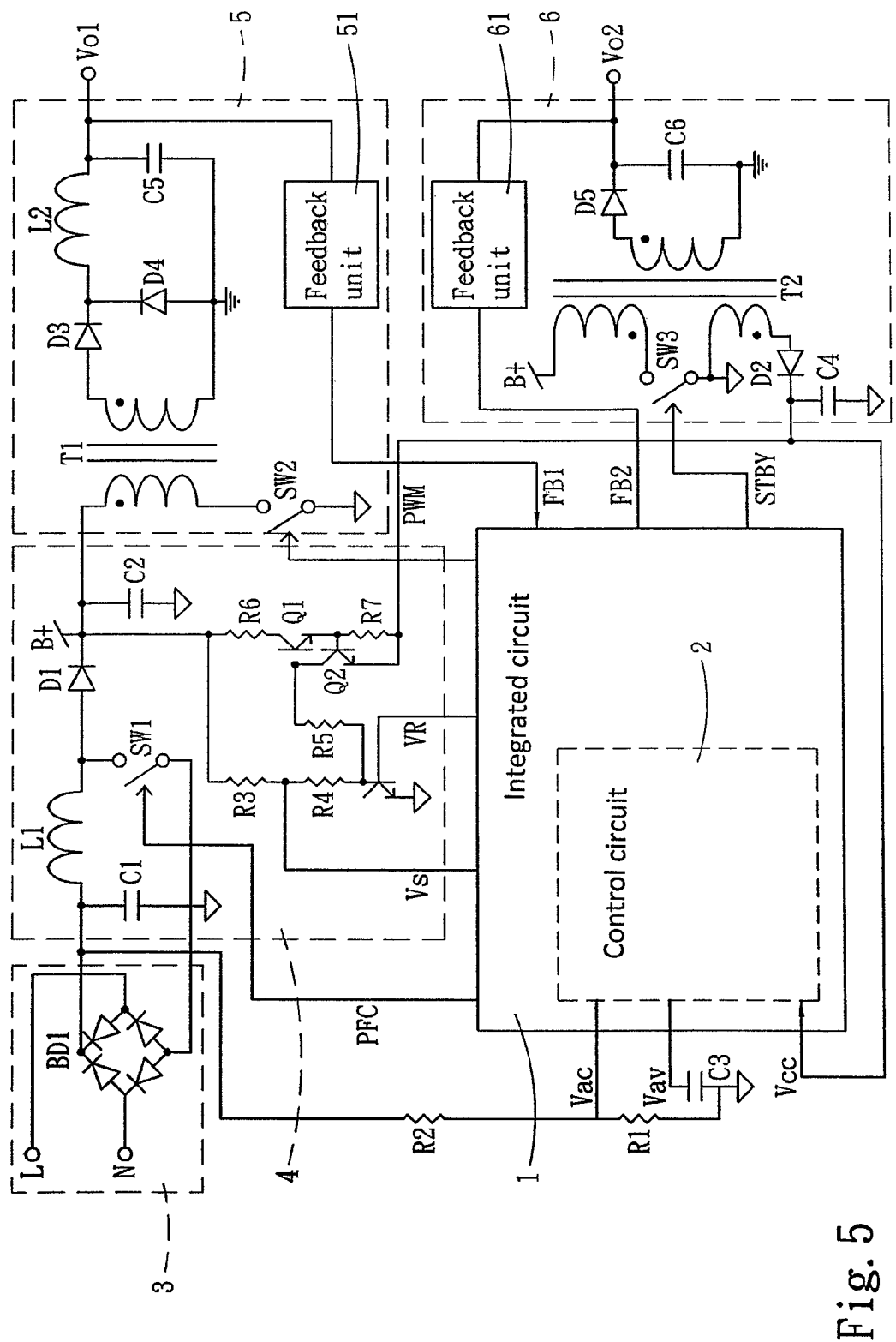
FIG. 5 is a circuit diagram of a circuit of a preferred embodiment of the present invention.
Figure 6:
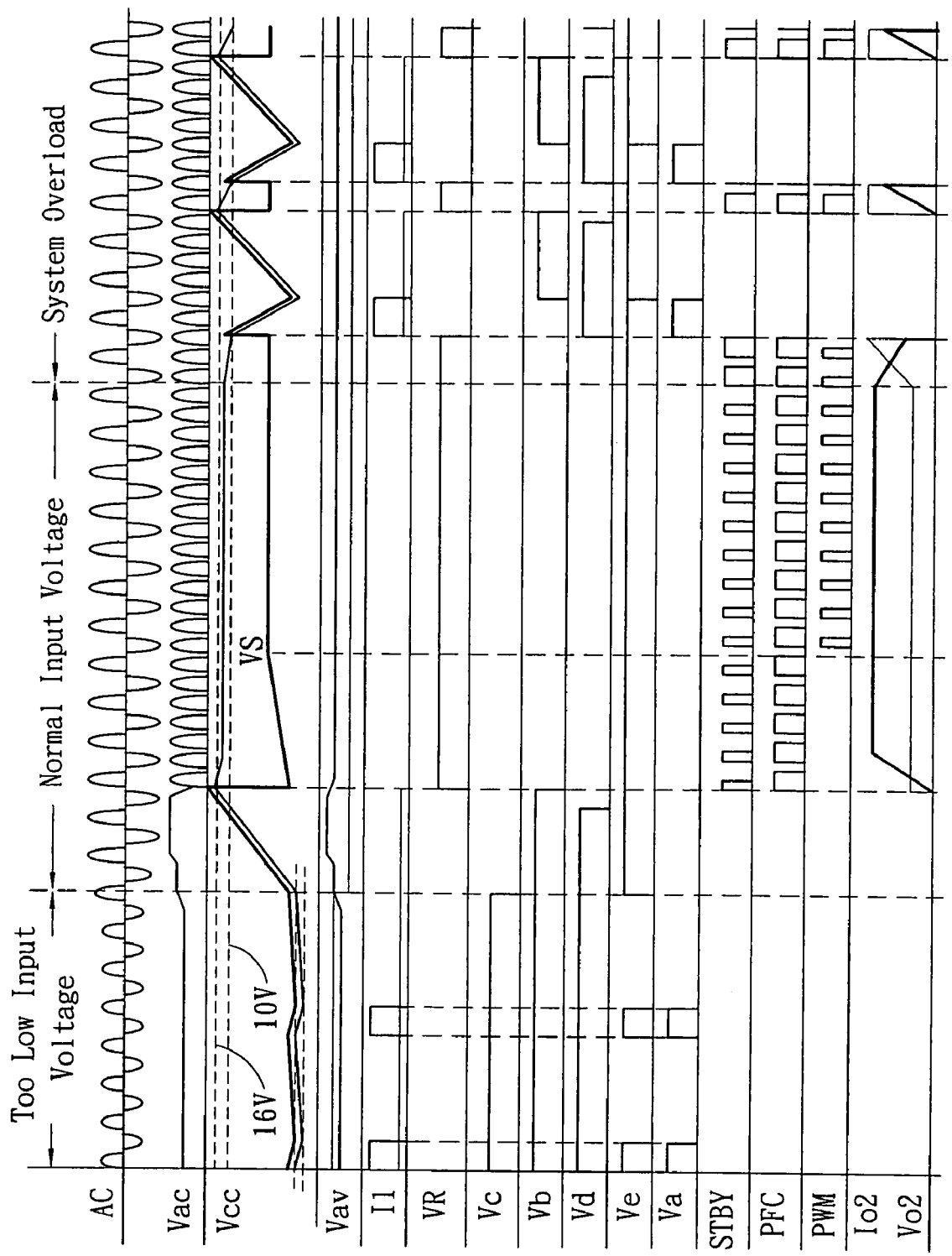
FIG. 6 is a waveform diagram of nodes of a preferred embodiment of the present invention.
Figure 7:
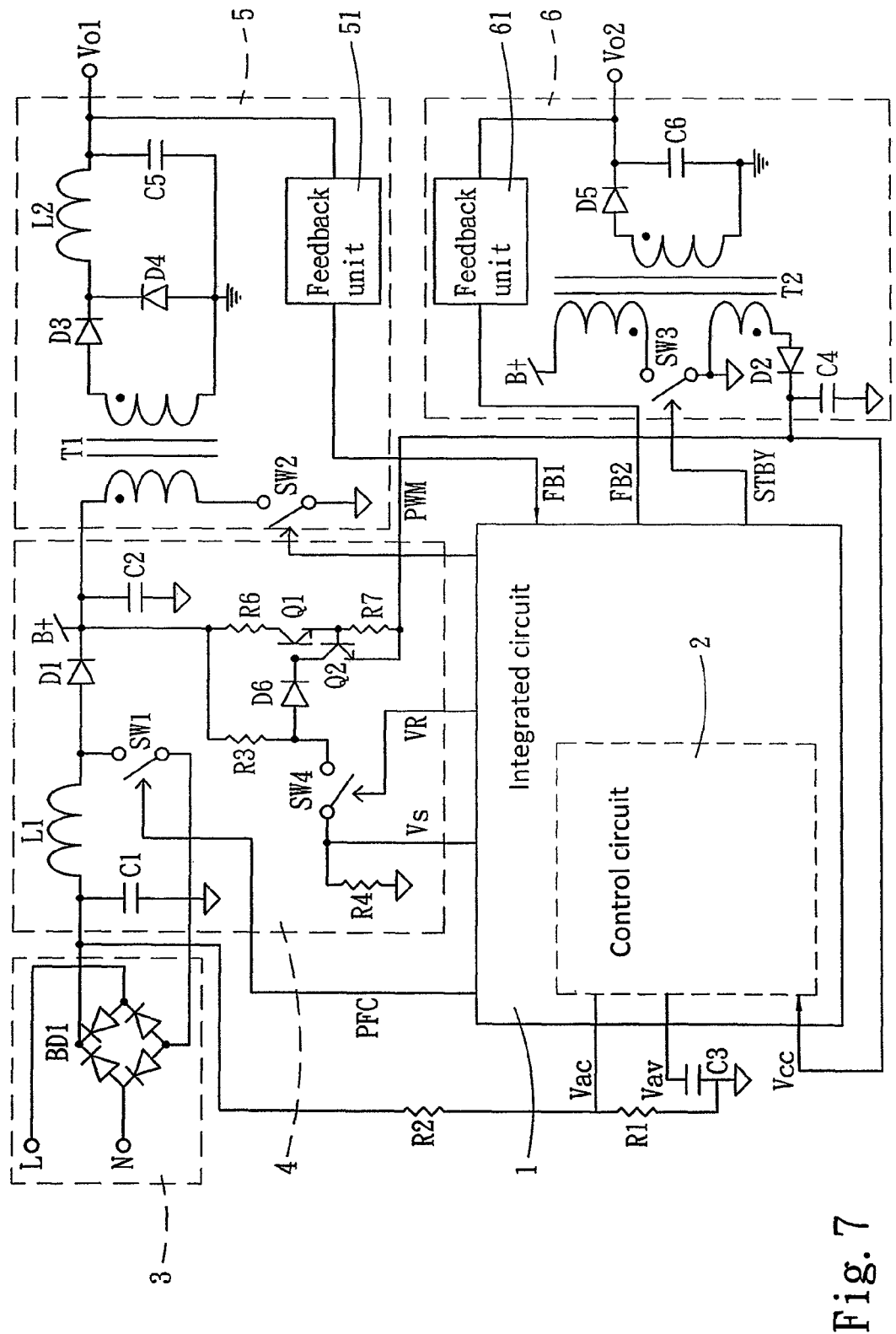
FIG. 7 is a circuit diagram of a circuit of another preferred embodiment of the present invention.

Referring to FIG. 5 for a circuit diagram of a circuit of the present invention being applied in a power supply, the circuit comprises an AC input section 3, a power factor correction unit 4, a primary power system 5 including a feedback unit 51, a stationary power system 6 including a feedback unit 61 and an integrated circuit 1. The integrated circuit 1 includes a power factor control unit 11, a pulse wave control unit 12 and a stationary power control unit 13, and the start-up cycle control circuit 2 is integrated into the integrated circuit 1. The power factor correction unit 4 in the circuit, the primary power system 5 and the stationary power system 6 are controlled by the power factor control unit 11, the pulse wave control unit 12 and the stationary power control unit 13 respectively, and thus the control unit 22 of the start-up cycle control circuit 2 controls the start-up cycle of the power factor control unit 11, the pulse wave control unit 12 and the stationary power control unit 13 by the start-up signal Vok. In other words, the working cycle of the power supply is controlled. Further, the start-up signal Vok is connected to a transistor Q3 of the power factor correction unit 4 of the circuit as shown in the figure, and the transistor Q3 is selectively and electrically conducted to determine whether or not the power factor control unit 11 to obtain the detection signal Vs of the power factor correction unit 4. Referring to the waveform diagram as shown in FIG. 6, the power factor control unit 11, the pulse wave control unit 12 and the stationary power control unit 13 stop their operations if the input power average Vav of the integrated circuit 1 has not reached the normal operating voltage value, and the bypass modulation unit 24 performs a voltage division to drive the bias voltage detection unit 23 to obtain the bias voltage power Vcc for maintaining the idle voltage value. After the input power average Vav has reached the normal operating voltage, the voltage division stops increasing the bias voltage power Vcc. After the bias voltage power Vcc has reached the start-up voltage value (which is set to 16V in this embodiment) for starting the integrated circuit 1, the power factor control unit 11, the pulse wave control unit 12 and the stationary power control unit 13 start operating. In an overload of the circuit system, the bias voltage power Vcc drops to the cut-off voltage value (which is set to 10V in this embodiment). After the bypass modulation unit 24 drops the bias voltage power Vcc to the idle voltage value, the bias voltage power Vcc rises to the start-up voltage value again, and the integrated circuit repeats the starting and shutting process until the overload state is released. Referring to FIG. 7, the power factor correction unit 4 can be changed by using the start-up signal Vok to control the electrical conduction of a metal oxide semiconductor field effect transistor (MOSFET) SW4, such that the power factor control unit 11 is driven to determine whether or not to obtain a detection signal Vs of the power factor correction unit 4.

The method and circuit for controlling a start-up cycle are applied in the integrated circuit 1 and produce and start a protection mechanism when there is an overload of the integrated circuit 1, so as to prevent the integrated circuit 1 from consuming too much power or from being overheated or damaged due to the quick sudden starting and shutting process.

In summation of the description above, the present invention herein enhances over the prior art and further complies with the patent application requirements, and thus is duly applied for the patent application.

While the invention has been described by means of specific embodiments, numerous modifications and variations could be made thereto by those skilled in the art without departing from the scope and spirit of the invention set forth in the claims.

What is claimed is:

1. A method for controlling a start-up cycle, applied in an integrated circuit of a circuit system of a power supply, and the circuit system setting a normal operating voltage value and obtaining an AC input power, and the input power obtaining a bias voltage power for the normal operation of the integrated circuit, and the integrated circuit setting a start-up voltage value for starting the integrated circuit, a cut-off voltage value for shutting down the integrated circuit, and an idle voltage value, and the start-up cycle of the integrated circuit rising from the idle voltage value to the start-up voltage value through the bias voltage power to start the integrated circuit, or dropping from the start-up voltage value to the cut-off voltage value to shut down the integrated circuit, and the control method comprising the steps of:

(A) obtaining an input power average, and determining whether or not the input power average has reached the normal operating voltage value;
(B) maintaining the bias voltage power at the idle voltage value, if the input power average has not reached the normal operating voltage value;
(C) driving the bias voltage power to raise to the start-up voltage value to start operating the integrated circuit, if the input power average has reached the normal operating voltage value;
(D) shutting down the integrated circuit and continuing dropping the bias voltage power to the idle voltage value, and then rising from the idle voltage value to the start-up voltage value, if an overload of the circuit system causes a drop of the bias voltage power from the start-up voltage value to the cut-off voltage value, so as to repeat starting and shutting down the integrated circuit until the overload state is released.

2. The method for controlling a start-up cycle as recited in claim 1, wherein the input power average is determined whether or not the normal operating voltage value range has been reached by using an input voltage as a first constant voltage source of the normal operating voltage value, and the input power average is compared with an output of the first constant voltage source to determine whether or not the input power average is larger than or equal to the normal operating voltage value.

3. The method for controlling a start-up cycle as recited in claim 1, further comprising a step of defining an abnormal operating voltage value, so that the integrated circuit is shut down when the input power average drops from the normal operating voltage value to the abnormal operating voltage value.

4. The method for controlling a start-up cycle as recited in claim 3, wherein the input power average is determined whether or not it drops to the abnormal operating voltage value by using an output voltage as the second constant voltage source of the abnormal operating voltage value, and the input power average is compared with an output of the second constant voltage source to determine whether or not the input power average is smaller than the abnormal operating voltage value.

5. The method for controlling a start-up cycle as recited in claim 1, wherein the bias voltage power is maintained at the idle voltage value by a voltage division method, such that the bias voltage power is not greater than the idle voltage value.

6. The method for controlling a start-up cycle as recited in claim 5, wherein the voltage division method electrically conducts a voltage division loop for dropping the bias voltage power.

7. The method for controlling a start-up cycle as recited in claim 1, wherein when the circuit system is overloaded, the bias voltage power drops from the start-up voltage value to the cut-off voltage value, and a voltage division loop is used for dropping the bias voltage power to the idle voltage value.

8. The method for controlling a start-up cycle as recited in claim 7, wherein the voltage division loop is shutdown to raise the bias voltage power to the start-up voltage value, after the bias voltage power drops to the idle voltage value.

9. The method for controlling a start-up cycle as recited in claim 1, wherein the circuit of the method comprises a bias voltage input terminal and an alternating current input terminal, and the circuit determines whether or not the inputted bias voltage power and alternating current fall within a normal operating range as a basis for controlling a start-up cycle of an integrated circuit, and the control circuit comprises:

a bypass modulation unit, connected to the bias voltage input terminal, for forming a voltage division loop;

a bias voltage detection unit, for receiving the bias voltage power, and setting a start-up voltage value to start the integrated circuit, a cut-off voltage value and an idle voltage value to shut down the integrated circuit, and comparing the bias voltage power value with the start-up voltage value and the cut-off voltage value, and producing a too-low bias voltage signal if the bias voltage power is smaller than the start-up voltage value, and producing a bias voltage abnormal signal if the bias voltage power is smaller than the cut-off voltage value;

a buffer unit, for receiving the alternating current, and converting the alternating current into an input power average;

an input voltage detection unit, for obtaining an average value of the AC voltage, and producing a normal operating voltage value, and comparing with the average value of the AC voltage, and generating an input abnormal signal if the average value of the AC voltage value has not reached the normal operating voltage value, and stopping outputting the input abnormal signal if the average value of the AC voltage value has reached the normal operating voltage value;

a control unit, separately connected to the bypass modulation unit, the bias voltage detection unit and the input voltage detection unit, for receiving the too-low bias voltage signal, the bias voltage abnormal signal and the input abnormal signal to output a voltage division signal to the bypass modulation unit if the input power average has not reached the normal operating voltage value and the bias voltage power is smaller than an initial state of the start-up voltage value, such that when the bypass modulation unit is at the initial state, the voltage of the bias voltage power is divided to maintain the bias voltage power at the idle voltage value, and if the input power average has reached the normal operating voltage, the bypass modulation unit stops the voltage division to gradually increase the bias voltage power till the bias voltage power exceeds the cut-off voltage value and the start-up voltage value, and the control unit outputs a start-up signal for the normal operation of the integrated circuit normal, and if the integrated circuit is operating and the bias voltage power drops below the cut-off voltage value, the integrated circuit is shut, the bypass modulation unit divides the voltage of the bias voltage power to drop the bias voltage power to the idle voltage value, and then stops the voltage division to raise the bias voltage power to the start-up voltage, and continues detecting the bias voltage power and the input power average for controlling the start-up cycle of the integrated circuit.

10. The method for controlling a start-up cycle as recited in claim 9, wherein the buffer unit includes a first comparator having a positive terminal, a negative terminal and an output terminal, and a resistor connected to the output terminal, and the positive terminal of the first comparator is connected to the alternating current input terminal for obtaining the alternating current, and the negative terminal is connected to the output terminal to form a buffer, and the buffer unit is connected to an external capacitor for obtaining an outputted input power average.

11. The method for controlling a start-up cycle as recited in claim 9, wherein the input voltage detection unit includes a first comparator having a positive terminal, a negative terminal, an output terminal, a first constant voltage source and a second constant voltage source and a switch controlled by an output of the first comparator, and the negative terminal of the first comparator obtains the input power average, and the positive terminal of the first comparator is connected to an end of the switch, and another end of the switch is switched between the first constant voltage source and the second constant voltage source, and the switch is switched by controlling an output of the first comparator.

12. The method for controlling a start-up cycle as recited in claim 11, wherein the first constant voltage source defines the normal operating voltage, the second constant voltage source defines an abnormal operating voltage value.

13. The method for controlling a start-up cycle as recited in claim 12, wherein the output terminal of the first comparator outputs an input abnormal signal when the input power average is smaller than the normal operating voltage, and outputs the input abnormal signal when the input power average drops from the normal operating voltage to the abnormal operating voltage value.

14. The method for controlling a start-up cycle as recited in claim 9, wherein the bias voltage detection unit includes a first comparator and a second comparator, each having a positive terminal, and a negative terminal, an output terminal, and the bias voltage detection unit further includes a third constant voltage source, a fourth constant voltage source, a fifth constant voltage source and a switch, and the negative terminal of the first comparator is connected to the bias voltage input terminal, and the positive terminal of the first comparator is connected to an end of the switch, and another end of the switch is switched between the third constant voltage source and the fourth constant voltage source, and the output terminal of the first comparator is connected to the control unit, and the switch is switched by controlling an output of the first comparator, and the negative terminal of the second comparator is connected to the bias voltage input terminal, and the positive terminal of the second comparator is connected to the fifth constant voltage source, and the output terminal of the second comparator is connected to the control unit.

15. The method for controlling a start-up cycle as recited in claim 14, wherein the third voltage source defines the idle voltage value, and the fourth constant voltage source defines the start-up voltage value, and the fifth constant voltage source defines the cut-off voltage value.

16. The method for controlling a start-up cycle as recited in claim 14, wherein the first comparator outputs the too-low bias voltage signal, and the second comparator outputs the bias voltage abnormal signal.

17. The method for controlling a start-up cycle as recited in claim 9, wherein the bypass modulation unit includes a first comparator having a positive terminal, a negative terminal and an output terminal and a voltage division loop having a current source, and a positive terminal of the first comparator is connected to the bias voltage power input terminal for obtaining the bias voltage power and connected to the voltage division loop, and a negative terminal of the first comparator is connected a third voltage source, and an output terminal of the first comparator is connected to the control unit.

18. The method for controlling a start-up cycle as recited in claim 17, wherein the voltage division loop starts and shuts down its current source by controlling a voltage division signal of the control unit.

19. The method for controlling a start-up cycle as recited in claim 9, wherein the start-up cycle control circuit is integrated into the integrated circuit.

* * * * *